Patented May 27, 1930

1,760,388

UNITED STATES PATENT OFFICE

CLARENCE C. VOGT, OF PITTSBURGH, PENNSYLVANIA

DENTAL CEMENT

No Drawing.    Application filed August 11, 1926. Serial No. 128,713.

The present invention relates to dental cement, and more especially to a dental cement in which the powder or a substantial proportion of it is reduced to grains of colloidal dimensions.

Practically all dental cements are marketed as a powder and a liquid which are to be mixed by the dentist.

The powder consists of a basic material, such as either the black or the red oxide of copper in the oxyphosphate of copper cements; or zinc oxide modified by silica or bismuth oxide, or by long heating in the zinc oxyphosphate cements; or a calcium aluminum silicate along with other complex silicates, fluosilicates and phosphates in the silicate cements.

The liquid is phosphoric acid diluted in water and further modified by the addition of a small amount of some metallic oxide or hydroxide, such as of zinc or aluminum.

The basic powder reacts with the acid liquid to form metallic phosphates in the first two classes, and metallic phosphates along with other complex compounds in the silicate cements. These phosphates act as the cementing salts which bind the particles together and form the dental cement.

In the usual process of manufacturing, the dental cement powder is ground dry in a pebble mill, ball mill or other suitable grinding device until the material "lumps" or "cakes" to such a degree that further grinding is not effective. The lumping or caking is caused by the finely ground material adhering to the sides of the mill or to the grinding balls or pebbles. The fine material adheres together and entraps air between the particles, which air forms a cushion which prevents finer grinding. After the material is ground until the lumping stage occurs, it is removed and sifted through a fine mesh sieve, usually about 300 meshes per inch.

The material when examined under a microscope is found to consist practically entirely of fine grains or particles, the dimensions of which are considerably larger than the colloidal dimensions. When a dental cement powder as heretofore made is thrown into water practically all of the powder will immediately settle out.

I have found that it is possible to grind these dental cement powders so that a large part of the powdered material will be of colloidal dimensions. When a powder is ground by my process and thrown into water a large proportion will remain in permanent suspension, thus demonstrating that the particles are colloidal and are of sufficiently small dimensions to have a Brownian movement. The suspension also gives the Tyndall effect upon the passage of a beam of light through the suspension.

I have found that the powder or at least a portion of the powder may be reduced to colloidal dimensions by wet grinding with a material which does not dissolve the powder or react with or peptize the particles. I have found that it is not practicable to use wet grinding, using either water or alcohol as the liquid, because of the solvent action of these liquids on the dental cement powders. Because of the solvent action some of the basic material is removed and this interferes with the setting of the cement. In addition, the peptizing action of the liquid makes the separation of the colloidal particles from the solvent difficult.

I have found that by grinding the powder in a liquid which is not a solvent for the powder or does not react with or peptize the particles, it is possible to reduce their state of subdivision to practically colloidal dimensions.

In my preferred embodiment I dry grind or otherwise reduce the material to a fine powder but of greater than colloidal dimensions, and then continue grinding in a suitable grinding mill, such as a pebble mill or other mill of the ball type or in a colloid mill, in the presence of acetone. The acetone prevents the material from lumping or caking in the mill and allows the grinding to be continued until the powder or a considerable part of it is reduced to colloidal dimensions. The acetone, of course, prevents the air cushioning incident to dry grinding. The proportion of the powder which is reduced to grains of colloidal dimensions may be controlled by the length of time of the wet grinding with the acetone. For commercial purposes the grinding should be continued until practically all of the material will pass readily through a sieve having 500 meshes to the inch. Such material, while it may not have all of the powder reduced to colloidal dimensions, has a sufficient amount to give the beneficial effects hereinafter pointed out.

Another rough test in the case of the silicate powders is to try a little of the powder between the teeth. The silicate powders in dental cements as now made have a gritty feeling between the teeth, but when the silicate powder is ground according to my process the gritty feeling disappears entirely and the powder has a smooth feeling between the teeth.

After the grinding has been carried out to the desired degree, the mixture is drawn off from the mill. The greater part of the acetone removed by filtering and the residue gently heated to evaporate the acetone. The material is then ready to be packaged and sold for use in making dental cements.

I prefer to use acetone because it has no solvent action on the material. It does not tend to peptize or hold the finely ground material in suspension and is soluble in water, so that should a thin molecular film of acetone adhere to the particles of powder it would not interfere with the reaction between the powder and the liquid when the cement is mixed by the dentist.

However, liquids other than acetone may be used, such, for example, as the petroleum products such as kerosene or naphtha. In case these are used the residue should be washed with some suitable solvent for the oil, such as acetone. Examples of other materials which may be used and which are sufficiently volatile so as not to require washing are ethyl ether and chlorinated hydrocarbons, such as dichlorethylene, carbon tetrachloride, chloroform, etc.

The powder having its grains or a considerable proportion of its grains of colloidal dimensions has certain valuable properties as a dental cement. It is known that the thinner the layer of the cementing material, the stronger the union between the two substances being cemented together. Heretofore it has not been possible to make this layer of dental cement as thin as desirable because of the size of the particles of the powder, but in a dental cement powder prepared by my process all of the particles are either of colloidal dimensions or sufficiently approaching colloidal dimensions to permit of a very much thinner layer than is possible with the dental cements as now manufactured. The adhesiveness of a dental cement is to a large extent dependent upon the amount of reaction possible between the powder and the liquid during the mixing of the cement. By using a powder in which the grains or a considerable proportion of the grains are of colloidal dimensions, a much greater reaction is made possible between the powder and liquid than is possible in the dental cements as now manufactured. Also, because of the fineness of the particles, the cement, when it is set, is of a more homogeneous character and has greater strength and resistance to wear.

While the invention may be applied to the manufacture of all types of dental cements, it is particularly applicable to the manufacture of silicate cements. Heretofore silicate cements have not been satisfactory for cementing crowns, bridges and inlays because they were not as adhesive as the zinc cements. The silicate cements, however, have certain advantages over the zinc cements in that they are less soluble and are harder and more resistant to wear and are translucent. I have found that by grinding the powder for the silicate cement as herein described it is possible to increase the adhesiveness of the silicate cements to practically that of the oxyphosphate of zinc cements as now manufactured, thus producing a silicate cement having the well recognized advantages of insolubility, strength and translucence, combined with the necessary adhesive qualities for use in cementing crowns, bridges, inlays and the like.

The preparation of the silicate cement powder by my process also imparts other advantageous characteristics to the silicate cement. It has been recognized by the dental profession that more pulps of filled teeth die under silicate fillings than under oxyphosphate of zinc fillings when the cements are used either as fillings or to cement inlays in place. The concensus of opinion is that this is due to more free acid in the plastic silicate cements than in the zinc cements. The reaction between the basic powder and the acid liquid is proportional to the surface exposed by the particles. Therefore, when the powder, or a considerable proportion of the powder, is in particles of colloidal dimensions, there is a much more complete neutralization of the acid in the liquid than is possible with cement powders as now ground, and a silicate cement therefore may be put into the tooth containing no more uncombined acid than that of a zinc oxyphosphate cement.

While it is possible by my process to increase the adhesiveness of the silicate cements to practically that of the oxyphosphate of zinc cements as now manufactured, the adhesiveness of the oxyphosphate of zinc cements or the copper cements may be increased greatly beyond the adhesiveness of those cements as now manufactured.

While I have specifically described the preferred embodiments and applications of my invention, it is to be understood that the invention is not so limited but may be otherwise embodied within the scope of the following claims.

I claim:

1. A finely ground silicate dental cement powder of substantially uniform composition and having a sufficient proportion of the material in grains of colloidal dimensions to materially increase the adhesiveness of the cement.

2. A finely ground dental cement powder of substantially uniform composition and having a sufficient proportion of the material in grains of colloidal dimensions to materially increase the adhesiveness of the cement.

In testimony whereof I have hereunto set my hand.

CLARENCE C. VOGT.